United States Patent

[11] 3,522,820

| [72] | Inventors: | John D. Watts<br>Monroeville, Pennsylvania;<br>William G. Lunt, Monroeville,<br>Pennsylvania |
|---|---|---|
| [21] | Application No.: | 706,026 |
| [22] | Filed: | Feb. 16, 1968 |
| [45] | Patented: | Aug. 4, 1970 |
| [73] | Assignee: | Rockwell Manufacturing Company<br>Pittsburgh, Pennsylvania<br>a Corp. of Pennsylvania |

[54] PLUG VALVE ASSEMBLY
8 Claims, 10 Drawing Figs.

[52] U.S. Cl. ............................................. 137/556;
215/309, 317
[51] Int. Cl. ............................................. F16k 5/06, 5/02
[50] Field of Search ....................................... 137/556;
251/184, 309, 317

[56] References Cited
UNITED STATES PATENTS

| 2,110,098 | 3/1938 | Strecker | 251/184 |
| 2,488,283 | 11/1949 | Franck | 251/184XR |
| 2,762,601 | 9/1956 | Clade | 251/317XR |
| 2,845,247 | 7/1958 | Housekeeper et al. | 251/317XR |
| 3,085,592 | 4/1963 | Zajac et al. | 137/556 |
| 3,090,594 | 5/1963 | Floyd | 251/317XR |
| 3,097,585 | 7/1963 | Carlson | 251/309 |
| 3,326,519 | 6/1967 | Freed | 251/317 |

*Primary Examiner*— Henry T. Klinksiek
*Attorney*—Strauch, Nolan, Neale, Nies and Kurz ABSTRACT: A plug valve construction, wherein a metal valve body having a through flow passage intersected by a bore rotatably mounting a ported tapered plug has annular solid plastic seat rings supported on inclined surfaces in recesses formed in internal body bosses surrounding the intersections of said bore with the passage, with the plug surface engaging areas of the seat rings lying in a conical envelope, a spring being provided for urging the plug into engagement with the seat rings and an external indicator being provided for showing seat ring wear.

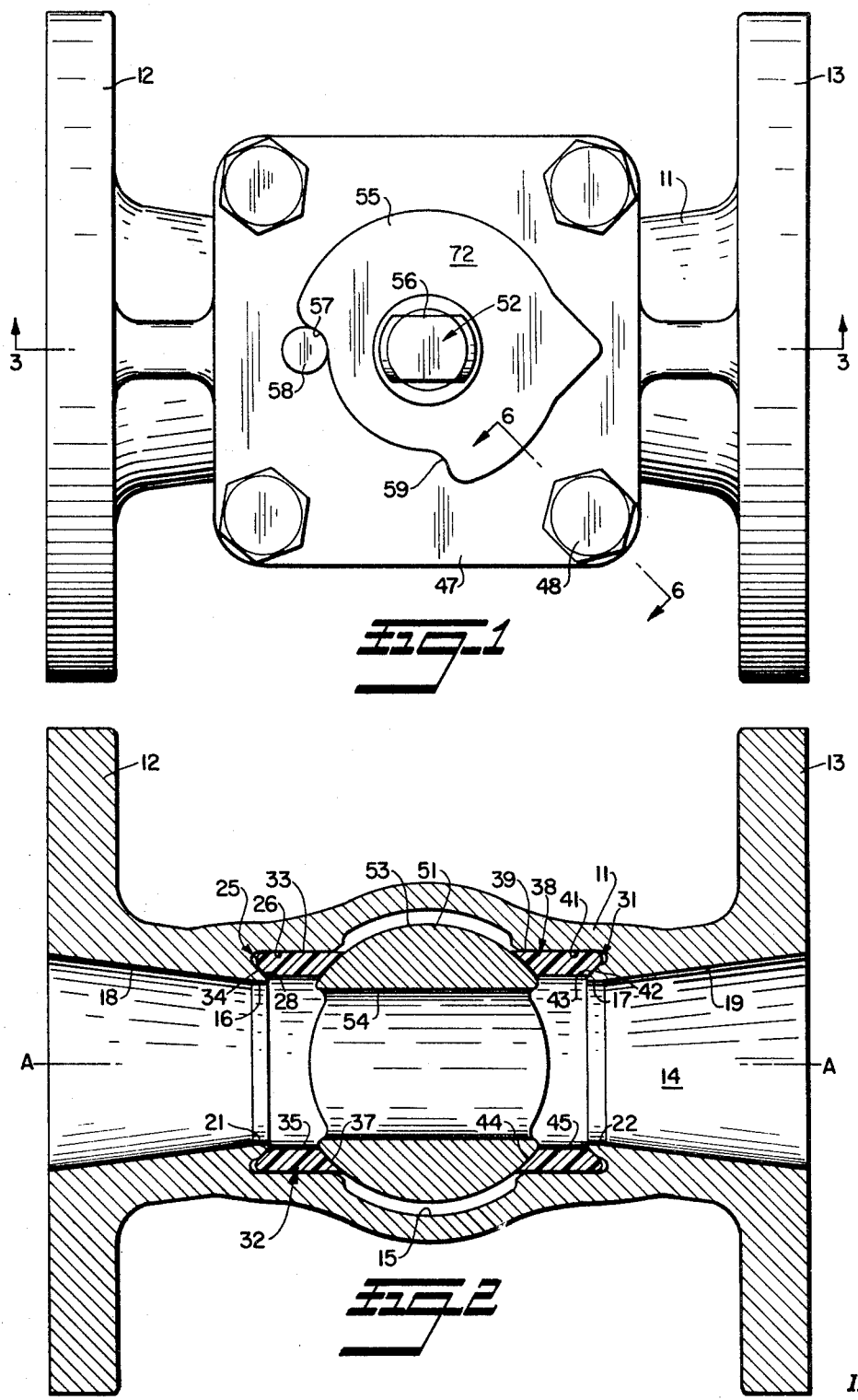

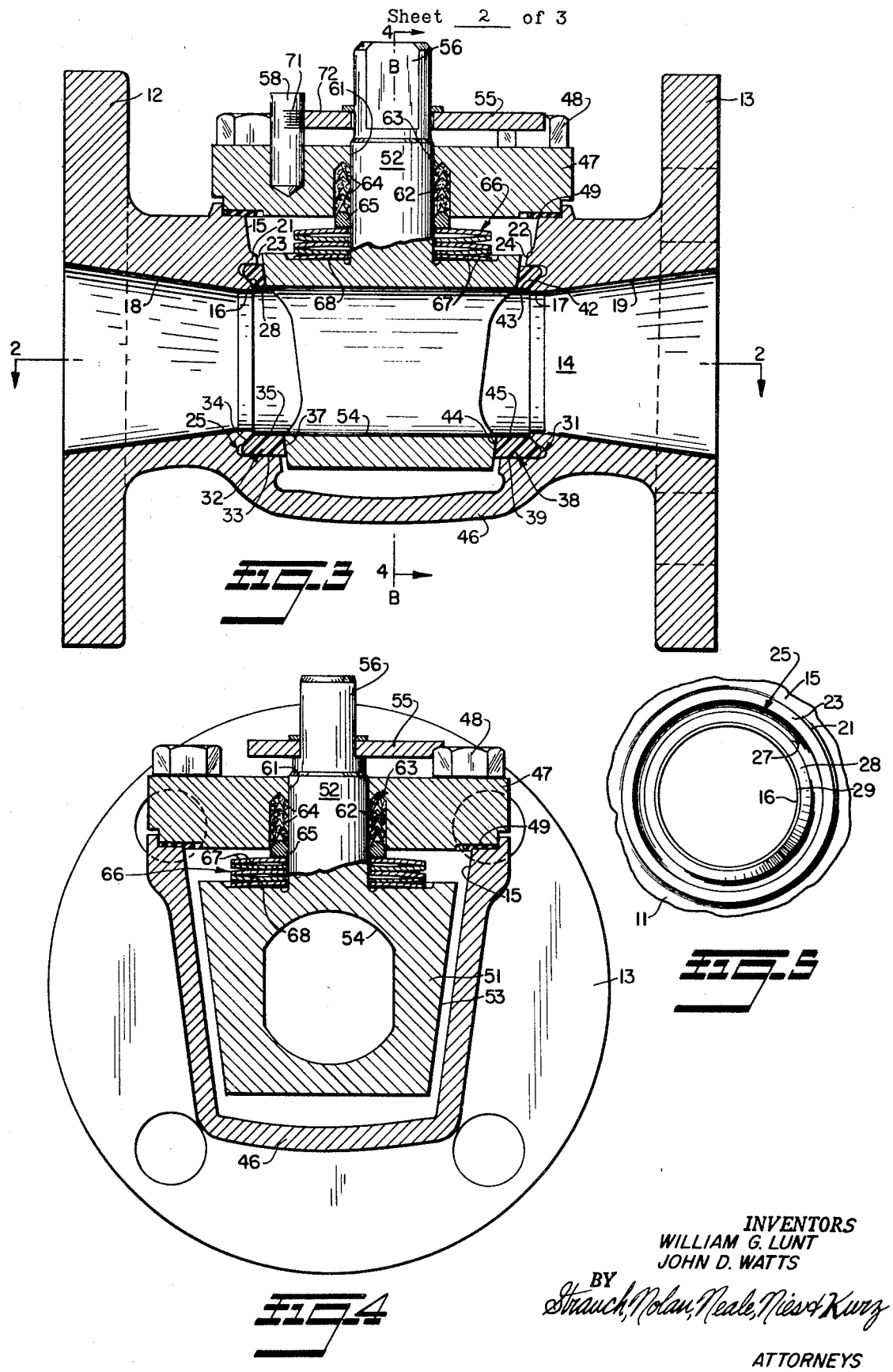

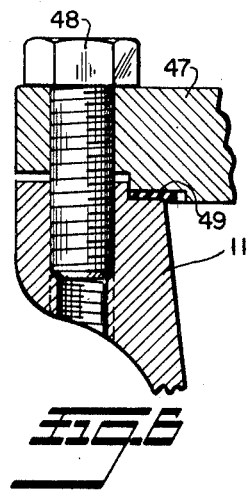
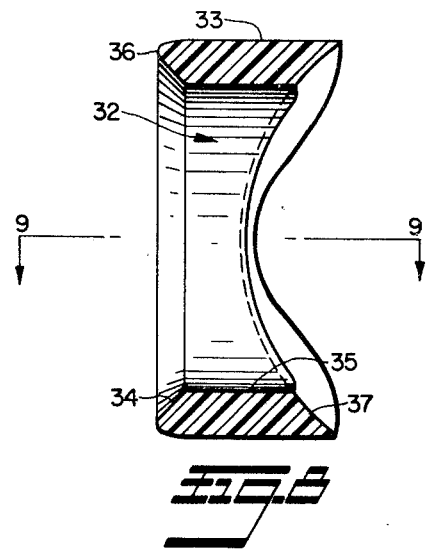
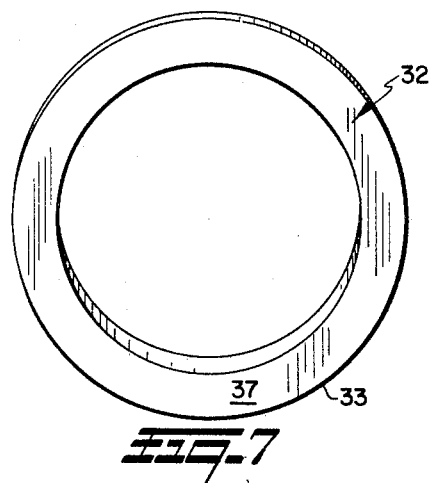
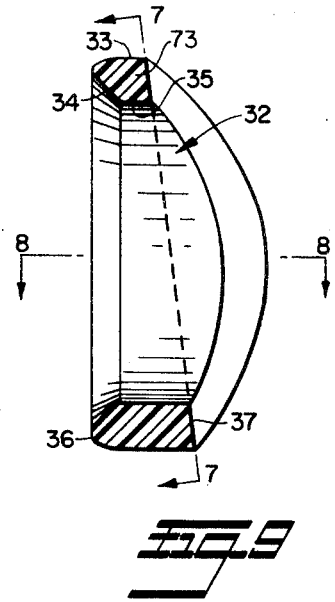
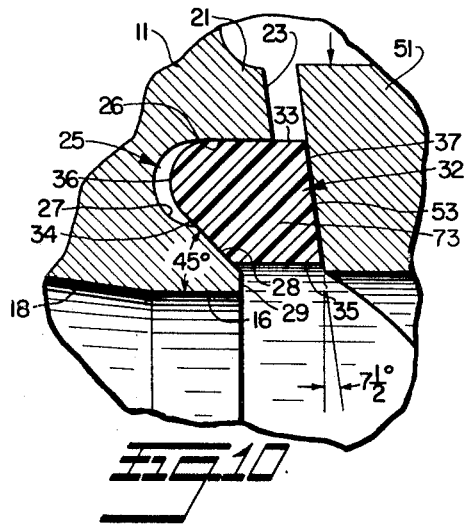
INVENTORS
WILLIAM G. LUNT
JOHN D. WATTS
ATTORNEYS

U.S. PATENT 3,522,820
PLUG VALVE ASSEMBLY

BACKGROUND, FIELD AND SUMMARY OF INVENTION

The invention provides a novel plug valve construction in a field where there has been considerable activity. A plug valve consists essentially and simply of a ported plug rotatable in a valve body to block or complete fluid passage through the body, but a single plug valve capable of solving all problems attendant to the handling of different fluids and/or different pressures has never been successfully provided. Many different plug valves have been proposed and patented embodying special plug seat arrangements, sealing devices and body structures. Corrosion resistant plastic seat rings have been proposed, and it has long been known to resiliently urge a plug onto its seat by a spring. Many different forms of valve plug stem packings have been proposed.

The invention provides a plug valve construction wherein corrosion resistant plastic seat rings are mounted and supported in a novel manner and this is the major object. More specifically each seat ring extends into a body recess in an internal body boss projecting into the plug receiving bore where it is internally supported by an inclined body face that converts part of the plug seating pressure to force opposing radial deformation of the seat ring. The structure also provides spring means reacting between the seated plug and a stem packing in the body, usually the body cover extending over the plug receiving bore, and also includes an indicator in the form of coacting index members on the valve stem and body cover for showing seat ring wear.

BRIEF DESCRIPTION OF DRAWINGS

FIGURE 1 is a top plan view showing a plug valve incorporating a preferred embodiment of the invention;

FIGURE 2 is a plan view in section substantially on line 2-2 in FIGURE 3;

FIGURE 3 is a side elevation in section substantially on line 3-3 in FIGURE 1;

FIGURE 4 is an end elevation in section substantially on line 4-4 in FIGURE 3;

FIGURE 5 is a fragmentary end view showing the boss around each passage section at the body bore;

FIGURE 6 is a fragmentary section substantially on line 6-6 in FIGURE 1 showing a detail of body structure;

FIGURE 7 is an end view of a seat ring as viewed substantially on line 7-7 in FIGURE 9;

FIGURE 8 is a section substantially on line 8-8 of FIGURE 9;

FIGURE 9 is a section substantially on line 9-9 of FIGURE 8; and

FIGURE 10 is an enlarged fragmentary section showing details of the seat ring fit with the body and plug.

PREFERRED EMBODIMENT

A metal plug valve body 11 has integral end flanges 12 and 13 for connection into a suitable pipeline. A through passage 14 having a normally horizontal axis A-A intersects at right angles a tapered body bore 15 having a normally vertical axis B-B which coincides with section line 4-4. Passage 14 preferably comprises substantially cylindrical sections 16 and 17 where it intersects bore 15, and generally conical outwardly diverging end sections 18 and 19 extending through the body flanges.

An internally projecting annular boss 21 on the surface of bore 15 surrounds the passage at 16, as shown in FIGURES 3, 5, and 10. A similar annular boss 22 surrounds the passage at 17. The inner surfaces 23 and 24 of bosses 21 and 22 lie in a conical envelope symmetrical about axis B-B.

As shown in FIGURES 2, 3, and 10 an annular recess structure 25 is formed at boss 21 symmetrical about axis A-A. Recess 25 has an outer cylindrical side wall 26 parallel to axis A-A, a rounded bottom 27 and a generally conical inner side wall 28 which may be about 45° with respect to axis A-A and is symmetrical about that axis. The longitudinally inner edge of side wall 28 preferably intersects a flat annular body surface 29 lying in a plane normal to axis A-A and is longitudinally displaced a short distance axially outwardly of surface 23. An identically shaped and located but oppositely facing recess structure 31 is provided around the passage at boss 22.

An integral seat ring 32, preferably a molded unit of polytetrafluoroethylene or any equivalent hard, tough smooth surfaced plastic, is mounted in recess 25. This ring is shown in FIGURES 7—9 adapted for and its association with recess 25 is shown best in FIGURE 10.

Ring 32 has an outer cylindrical surface 33 sized to fit slidably, smoothly and snugly with recess wall 26. A generally substantially 45° conical inner surface 34 of ring 32 is adapted for substantial area abutment with recess wall 28, and surface 34 is intersected by the cylindrical inner surface 35 of the ring which preferably is of slightly larger diameter than passage section 16. The axially outer ends of surfaces 33 and 34 are joined by a rounded end surface 36 lying generally in an annular envelope symmetrical about the central axis of ring 32.

The inner end of ring 32 is a tapered plug seating surface 37 lying in a substantially conical envelope and, as will appear, when ring 32 is mounted in recess 25 as illustrated in FIGURES 2 and 3, surface 37 is symmetrical about axis B-B. As also shown in FIGURE 10, the outer end 36 of ring 32 is disposed within the body recess and conical surface 37 is disposed within the body bore with short but definite clearance inwardly of boss surface 23.

It can be seen that rounded end surface 36 of ring 32 is dimensioned to have a definite clearance from rounded bottom 27 of the annular recess structure 25. This is for the purpose of controlling the unit loading on surface 34 of ring 32. Ring 32 is so dimensioned that the force of the plug urging the ring 32 into the body recess 25 is opposed by a definite surface 28. Rounded bottom 36 is cut away at the intersection with surface 28 so that increased force on the ring 32 results in increased unit loading, rather than additional bearing surface. This increases the sealing effect at surface 28, lessening The probability of leakage around ring 32.

Similarly an identical molded plastic seat ring 38 is mounted in recess 31 with its outer cylindrical surface 39 slidably snug within recess wall 41, its 45° end surface 42 in abutment with body surface 43 and its substantially conical plug seating surface 44 located within the body bore in spaced relation to boss 22. As illustrated, both annular conical contour surfaces 37 and 44 lie in the same concical envelope in the assembly of FIGURES 2 and 3 and symmetrical about axis B-B, with cylindrical openings 35 and 45 symmetrical and coaxial with axis A-A.

Body bore 15 is closed at its smaller lower end by integral body wall 46 and at its upper end by a thick metal plate cover 47 secured to body 11 as by corner bolts 48, there being an annular resilient seal gasket 49 compressed between the body and cover.

A tapered plug 51 having a rigid preferably integral threadless stem 52 is rotatably mounted within the body bore 15, being supported essentially wholly by seat rings 32 and 38. The outer peripheral surface 53 of plug 51 lies in a conical envelope of such angle as to seat snugly rotatably on seat surfaces 37 and 44, the angle of taper of the engaged plug and seat surfaces being non-locking and preferably in the neighborhood of about 7 ½° to the vertical axis of rotation B-B.

Plug 51 has a straight through uniform cross-sectional area port 54 which aligns with passage 14 in the fully open position of the valve shown in FIGURES 2 and 3. A stop plate 55 is fixed upon the non-circular upper end 56 of valve stem 52 and is formed with a stop face 57 engaged with a rigid pin 58 on cover 47 in the open position of the valve. Stop plate 55 is formed with a stop face 59 adapted to engage pin 58 and arrest valve plug 51 in fully closed position of the valve upon rotation of stem 52 clockwise through 90° in FIGURE 1.

Valve stem 52 is cylindrical where it extends through a central opening 61 in cover 47, and opening 61 has an enlarged diameter inner cylindrical counterbore portion 62 surrounding stem 56 and containing a flexible annular stem packing 63 in the form of chevron type rings 64. A flat sided cylindrical rigid metal ring 65 is slidably mounted between stem 52 and counterbore 62.

Resilient spring means 66 in the form of an annular stack of bowed spring plates 67 of the type known as Belleville springs is axially interposed between ring 65 and the plug 51.

As shown in FIGURE 4 alternate bowed springs 67 are oppositely arranged for inner and outer peripheral engagement. The inner periphery of the plate 67 at the top of the stack axially abuts the flat bottom of ring 65, and the outer periphery of the plate 67 at the bottom of the stack engages a flat annular-surface 68 on the upper end of plug 51. The inner periphery of the spring plate stack has rotational clearance with stem 52.

In assembly, with seat rings 32 and 38 in place in the respective recesses, plug 51 is seated on the seat rings and the stack of spring plates 67 dropped over stem 52. Then cover 47 with axially compressed packing 63 and ring 65 inserted in bore 62 is mounted on the body, with stem 52 projecting through it, and when bolts 48 are drawn fully tight plug 51 is urged into operative seating engagement with annular seat ring surfaces 37 and 44. There is no metal-to-metal surface contact between the tapered surfaces of plug 51 and valve body 11 so that wear in normal operation occurs mainly at the seat ring surfaces 37 and 44 that rub against the harder metal plug surface. The spring means at 66 is axially compressed during the foregoing assembly and it is thereby energized so that it continually resiliently applies a constant uniform spring pressure urging plug 51 into seated engagement with the seat rings, which pressure is maintained uniform even as the seat rings wear during operation. The spacing of surfaces 37 and 44 inwardly of bosses 21 and 22 insures that there will be no metal-to-metal plug to body contact during normal valve life. At the same time, spring means 66 also resiliently exerts through ring 65 an axial force on packing 63 extending to expand the packing radially into sealing engagement with the valve stem and cover. The reason Belleville springs are preferable is that such are known to exert a constant and reliably uniform force over a wide range of expansion sufficient to encompass any normal seat ring wear.

As shown in FIGURE 3 pin 58 is provided with a series of vertically spaced indicia lines 71. The adjacent horizontal top surface 72 of plate 55 is planar and its edge adjacent pin 58 serves as an index coacting with indicia 71. The purpose of this arrangement is to indicate wear on the seat inserts 32, 38 because as these inserts wear spring 66 displaces plug 51 vertically downwardly so that plate 55 fixed on the plug stem is displaced downwardly relative to pin 58 and a glance at the location of plate 55 relative to indicia 71 will inform as to the amount of wear on the plastic seat rings.

The above described mounting and support of the plastic seat rings 32 and 38 in the valve body is an important part of the invention. The provision of inclined body surface engagement of the seat ring, as that at surface 28 in FIGURE 10, provides radial stiffening support for the seat ring, particularly effective at its upper thinnest section 73 shown at the top of FIGURE 9 and in FIGURE 10. As plug 51 is urged onto its seat, it exerts forces on each seat ring that are directed substantially parallel to the line of flow, and these forces are opposed by abutment of the seat ring with the body surface 28. These forces, by reason of the 45° at surface 28, contain a component radially of the flow line that supports the seat ring internally and prevents its radial inward deformation particularly at the thin upper section 73. At the same time, the annular bosses 21 and 22 provide support for the seat rings 32 and 38 to prevent radial outward deformation.

The plug 51 is usually metal and the seat rings 32 and 38 are plastic and of different coefficient of thermal expansion from the plug metal. As the valve handles fluids of changing temperatures the plug and seat rings will differently expand or contract, but due to the action of spring 66 the relatively floating plug 51 automatically adjusts to maintain seating engagement with the seats regardless of the differentials in thermal expansion.

We claim:

1. A plug valve assembly wherein a valve body has a through flow passage intersected by a bore rotatably mounting a ported tapered plug adapted to be rotated between positions where it blocks or permits fluid flow through said passage, opposed axially inwardly open annular recesses in said body surrounding said passage at the intersections of said bore with said passage, each said recess being formed with a substantially cylindrical outer side surface and at its open end with a substantially conical inner side surface of uniform width that converges toward said plug bore, integral seat rings of solid nonmetallic plastic mounted in said recesses and formed at their inner ends with annular plug surface engaging areas lying in a conical envelope, each said seat ring having a substantially cylindrical outer peripheral surface in slidable engagement with the outer side surface of said recess, a substantially cylindrical inner peripheral surface extending axially outwardly from said plug surface engaging area in surrounding relation to the flow passage and a substantially conical internal support surface at its outer end in flush sealing abutment with said inner side surface of the associated recess, said internal support surface on each seat ring converging toward the flow passage to intersect the associated inner peripheral surface of said seat ring, and resilient means reacting between the plug and body for urging said plug into surface engagement with said plug engaging areas of the seat rings whereby the force exerted by said resilient means on said plug is effective to urge said seat rings outwardly with respect to said plug and tight sealing engagement between the engaged substantially conical abutting surfaces on said seat rings and said body.

2. The plug valve assembly defined in Claim 1, wherein the body at the intersections of said passage with said bore is formed with inwardly projecting annular boss structures wherein said recesses are formed.

3. The plug valve assembly defined in Claim 1, wherein said abutting surfaces are inclined at about 45° relative to the flow axis.

4. In the plug valve assembly defined in Claim 1, there being a space between the outer end of each seat ring and the bottom of the associated recess axially outwardly of said substantially conical recess inner side surface whereby the unit loading at said surface and therefore the sealing effect of said seat ring is a direct function of the plug biasing force tending to displace said seat ring into the recess.

5. The plug valve assembly defined in Claim 1, wherein a body includes a cover extending over said bore and a threadless stem rigid with the plug extends through an aperture in said cover, a stem packing assembly surrounds said stem within said aperture and said resilient means comprises spring means surrounding the stem and compressed between the plug and said packing assembly.

6. In the plug valve assembly defined in Claim 5, a stop projection on said cover, a stop member fixed on said stem for engagement with said projection to limit rotation of said plug between said positions, and seat ring wear indicating means comprising cooperating indicia and index means on said stop member and projection.

7. The plug valve assembly defined in Claim 5, wherein said packing assembly comprises an annulus of compressible material surrounding the stem and a rigid ring interposed between the packing annulus and said spring means.

8. The plug valve assembly defined in Claim 7, wherein said spring means is a stack of bowed spring plates.